Feb. 17, 1970    D. T. BRUMFIELD ET AL    3,496,559
SHORT CIRCUIT DETECTOR APPARATUS FOR ELECTRIC FENCES
Filed Sept. 1, 1967

INVENTOR.
DANIEL T. BRUMFIELD
JOSEPH (NMI) MASERJIAN
BY Carl R. Brown
Attorney

United States Patent Office 3,496,559
Patented Feb. 17, 1970

3,496,559
SHORT CIRCUIT DETECTOR APPARATUS FOR ELECTRIC FENCES
Daniel T. Brumfield, Carmel Valley Ranch, R.R. Box 78, Del Mar, Calif. 92014, and Joseph Maserjian, 11159 McVine Ave., Sunland, Calif. 91040
Filed Sept. 1, 1967, Ser. No. 665,052
Int. Cl. G08b 21/00
U.S. Cl. 340—254                    11 Claims

ABSTRACT OF THE DISCLOSURE

This short circuit detector apparatus for electric fences comprises a simple, inexpensive and low mass detector means for detecting short circuits in the open circuits of electric fences and that functions to identify the shorted section of the electric fence and the open circuits the shorted circuit in a manner that reduces the power drain on the power supply so that other sections of the electric fence may continue to operate, and that automatically closes the shorted circuit when the shorted conditions has been repaired.

BACKGROUND OF THE INVENTION

Electric fences have been used for several years to contain animals, such as horses, cows, and the like. Such known electric fences have several obvious advantages over other fences that are made of wood, barbed wire, rock, or the like in that they are less expensive to install, are easily moved, and if the electric fence is functioning correctly, will contain animals better than other known fencing. However, electric fences have the problem of short circuits that result from any of several causes such as, short circuits occurring at the connection to the supporting post, or as a result of animals knocking the fence down causing the fence to be short circuited to ground. When the electric fence is short circuited, not only is the section of the short circuited fence inoperable but also the other sections of the fence are also rendered inoperable because of the large current drain in the short circuit section. Further such short circuits are very difficult to detect. To detect a short circuit in a section of electric fence requires an inspection of the entire length of the fence. So it is usually necessary to walk the fence and closely inspect the fence throughout its length. Where there are several miles of fence, this can be a difficult and time consuming task since usually such short circuits can only be detected by very close visual inspection.

An electric fence depends upon a pulsating high voltage to deter animals from moving through the fence. Animals acquainted with such fences will periodically check the fence to determine whether it is in operation. When the fence is not in operation, then the animal, if it desires, moves through the single wire fence. While it would be advantageous to have more than one conductor wire in the electric fence, generally this creates more difficulties in keeping a two strand electric fence in operation and having to periodically visually check and correct shorts in two strands rather than one. Further, if two electric fence or strands are used with a single power supply, then a short circuit in one fence or strand will usually drain the electrical power from the power supply sufficiently so that there is insufficient power to energize the other fence, section of fence or strand.

Thus it is advantageous to have apparatus for sensing when a short circuit condition exists in a given section of electric fence and that quickly and easily indicates which section of the electric fence is experiencing the short circuit. This apparatus also, upon detecting the short, will open the circuit to the short circuited section of electric fence, thereby reducing the power drain on the power supply so that other sections of the electric fence remain operable. This permits the effective use of multiple sections or strands of electric fence or multiple electric fences that are energized by a single power supply.

SUMMARY OF THE INVENTION

Electric fences usually have a single high voltage, low current power generator that provides perodic pulses of high voltage and low current to one or more conductor wire circuits. In normal operation, the conductor wire circuits are open and the circuit is closed by animals contacting the wire and shorting the circuit to ground. The high voltage shocks the animals. However, since the current and power is low, the animals are not injured. Thus animals disliking the electrical shock refuse to go through the fence and the fence by a simple single wire or plurality of wire conductor circuits contain the animals. When the circuit for any reason is shorted to ground, then the current is drained from the conductor wire circuit and the remainder of the line is deenergized and does not function as an open circuit for receiving the high voltage, low current pulses.

To protect animals that become entangled in the fence, the usual known high voltage, low current power generator has internal circuitry that, when a short occurs, decreases the voltage from approximately 2,000 volts to about 18 volts, which is continued to be supplied. But such a low voltage is not an effective deterrent to other fenced animals. So a short in an electric fence circuitry effectively de-energizes the entire fence and all sections.

The short detector apparatus of our invention is separate from the high voltage, low current power generator and is normally mounted in each section or strand of the electric fence that comprises a separate circuit. The short circuit detector apparatus detects a short in the line by detecting when current flows in the line. The short circuit detector apparatus comprises its preferred embodiment a spiral wound bimetal coil that is connected at its center end to a resistor. The resistor and the free moving outer radial end of the bimetal coil are connected in series with the electric fence wire conductor at a point adjacent the high voltage, low electric fence power supply. The spring action of the spiral wound bimetal member closes the circuit and thus current resulting from a short circuit in the fence conductor flows through the bimetal coil and through the resistor. This current flow in the resistor causes the resistor to heat and also to heat the bimetal coil. Heating the bimetal coil causes the spiral of the coil to expand and thus rotates the free end out of series "contact" with the conductor wire of the electric fence. This opens the circuit and interrupts the power drain on the power supply.

The arcing of one or more of the detector apparatus is detectable by a visual inspection of the short circuit detector apparatus and further the lower power arcing between the bimetal end and the conductor wire causes an audible noise. The particular section of fence that is experiencing a short circuit can thus be determined by the visual or audible indication. Upon fixing the particular short circuit condition in the conductor wire fence circuit, the bimetal member automatically closes the circuit and the fence is returned to operable condition.

The detector apparatus has a very low mass and thus is operable by the low power supply normally used on electric fences. Further, the high impedance arc and the low heat power loss creates only a very low power drain leaving sufficient remaining power in the high voltage, low current power supply to supply other fence circuits that have not experienced a short circuit condition.

It is therefore an object of this invention to provide a new and improved short circuit detector apparatus for electric fences.

It is another object of this invention to provide a new and improved short circuit detector apparatus for electric fences that visually and audibly indicate which section of an electric fence circuit has a short circuit condition.

It is another object of this invention to provide a new and improved short circuit detector apparatus for electric fences that only requires low power for its operation.

It is another object of this invention to provide a new and improved short circuit detector apparatus for electric fences that is simple in operation, reliable, inexpensive, has a low mass, and that automatically closes the circuit when the short circuit condition has been corrected.

It is another object of this invention to provide a new and improved short circuit detector apparatus for a plurality of electric fence sections that decreases the power drain on the power supply by the short circuited section of the electric fence.

It is another object of this invention to provide a new and improved short circuit detector apparatus for electric fences that permits several electric fence circuits to be effectively energized by a single power supply even though one or more of the fence circuits may experience a short circuit condition.

It is another object of this invention to provide a new and improved short circuit detector apparatus for electric fences that opens a short circuited section of fence after a given time delay.

It is another object of this invention to provide a new and improved short circuit detector apparatus for multiple electric fence sections powered by a single power supply.

Other objects and advantages of the present invention will readily occur to those skilled in the art to which the invention pertains upon reference to accompanying detailed description in which like reference characters designate like parts throughout and in which.

Figure 1:
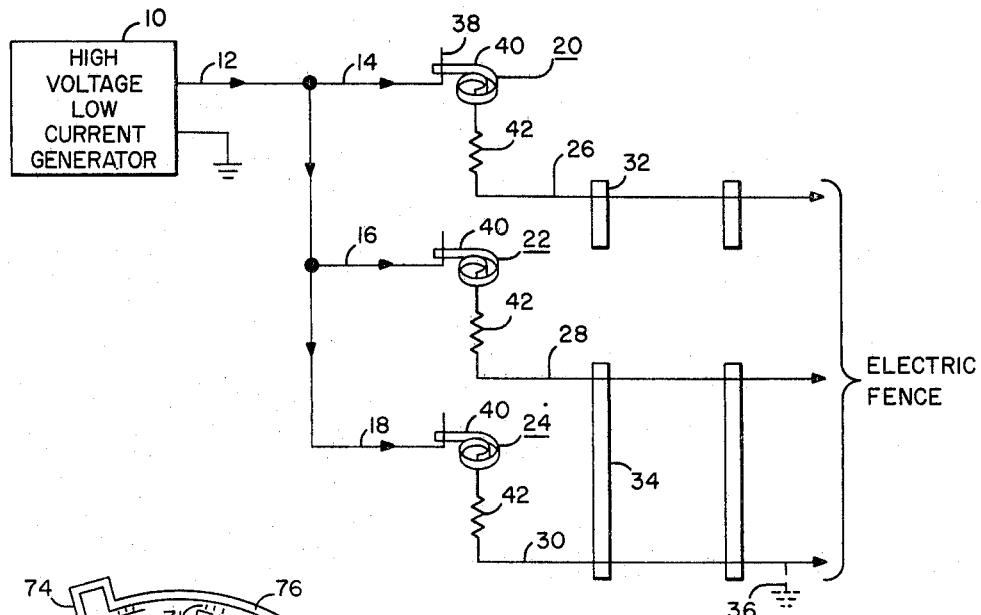
FIGURE 1 is a schematic view of an electric fence circuit having embodiments of the short circuit detector apparatus.

Referring now to FIGURE 1, a plurality of electric fence conductor wire circuits 26, 28, and 30 are illustrated as being mounted on fence posts 32 and 34. Wire 26 is a single wire fence mounted on a plurality of fence posts and conductor wires 28 and 30 illustrate at least a two-strand electric fence being mounted on fence posts 34. It may be understood that any number of separate conductor wire fence circuits may be installed on fence posts to constitute a long wire electric fence, or the electric fence may comprise a plurality of separate conductor wire fence sections or circuits having one or more wires, all of which are energized by a single high voltage, low current generator 10. The high voltage, low current power supply 10 is well known in the art and provides a high voltage pulse output in the order of 2,000 volts with a low current. Since the fence circuit is open there is no current draw on the power supply in normal operation. Even when an animal makes contact and short circuits the conductor wire of the fence, the short circuit is normally for a short period of time as the shocked animal quickly disengages from the fence, leaving the circuit open. When a more permanent short circuit occurs, such as illustrated in phantom by line 36, then the high voltage, low current generator, power supply operates to drop the voltage to approximately 18 volts. This can occur where an animal becomes entangled in the electric fence and continues to short circuit the fence for a long period of time. The dropping of the voltage prevents injury to the animal through prolonged contact with the energized electric fence wire. Such short circuits also occur where the conductor wire is shorted to ground, as may result from the fence being down or being short circuited to ground through a metal fence post. Thus, the high voltage, low current power supply provides power through line 12 to conductor wires 14, 16, and 18 and through the short circuit detector apparatus 20, 22, and 24 to the conductor wires of the electric fence circuits 26, 28 and 30.

The short circuit detector apparatus illustrated in FIGURE 1, comprises a bimetal coil 40 that is spiral wound and has connected to the center member of the spiral one end of a resistor 42. The other end of the resistor 42 is connected to wire 26. The flexible, freely movable end 40 of the bimetal coil is spring biased against conductor 38 that is connected to line 14. Accordingly, the bimetal member and the resistor are in series with the conductor wire fence circuits 14, 16, 18, 26, 28 and 30.

In operation, should a more permanent short 36 occur as illustrated in phantom, then the high voltage, low current power will flow through line 18, through short circuit detector apparatus 24 and conductor wire 30 to the short circuit 36. This current flow, even when the high voltage is reduced to 18 volts, provides sufficient current through resistor 42 to cause the resistor to heat. The resistor has sufficient wattage, that when heated also heats the adjacent bimetal coil. The bimetal coil reacts to the increase in temperature in a manner well known in the art and creates a force sufficient to overcome the loading of the spring in the bimetal coil. This moves the free end 40 in a rapid clockwise direction opening the direct circuit connection of member 40 with wire 18. This interruption of the high voltage, low current flow drastically reduces the drain on the power supply through the short circuit 36 in line 30 allowing the power supply to continue to provide the normal pulsing high voltage, low current power to lines 14 and 16. When the circuit in lines 18 and 30 is substantially interrupted, then the current through resistor 42 is reduced or ceased and the resistor cools also allowing the bimetal coil 24 to cool. The bimetal member upon cooling, slowly contracts, and approaches the conductor 38. A point is reached in this movement at which a sufficient current flows in an arc between the conductors to maintain the heat of the bimetal member at a constant level. This level establishes the ultimate width of the arc gap and the stable position of the bimetal member 40. The end 40 holds this stable position until the short circuit condition 36 has been corrected, or until a short circuit condition occurs in one of the other sections of the fence, whereupon the stable position will be slightly closer to connector 38 because of the overall slight reduction of power. The arc gap places a high impedance in the circuit that reduces the current flow to a practical minimum. Thus during the time period that the short circuited section is substantially open circuited by the short circuit detection apparatus, the other sections of the fence, such as sections 26 and 28 are energized for normal operation. The low power arc between the end of the bimetal coil and conductor 34 gives an audible sound.

Figure 2:
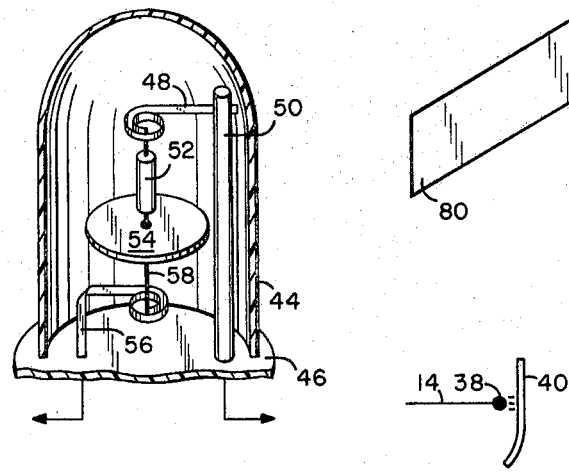
FIGURE 2 is a modified form of the short circuit detector apparatus of this invention.

Referring to FIGURE 2, a modified form of the invention comprises a pair of bimetal coils 48 and 56 that are spiral wound in opposite directions. One end of the bimetal coil 56 is rigidly secured to insulated base 46. A rigid vertical pole 58 is secured to and supported by the inner spiral end of the lower coil 56 and at its upper end is connected to a resistor 52 that is in turn connected to the inner spiral end of the bimetal coil 48 and supports the coil 48. A transparent housing 44 is mounted on the base 46 and electrical connections to the line leading to the high voltage, low current power supply and to the electric fence circuit make connection with coil 56 and conductor 50 through base member 46. A heat shield 54 is connected to and supported by the vertical pole 58 and shields the bimetal coil 56 from heat generated by resistor 52.

In operation, short circuit current flows through conductor 50, spiral wound bimetal coil 48, resistor 52, conductor pole 58, bimetal coil 56 and to the conductor wire fence circuit. As previously described, the current flows through the resistor 52 heating the bimetal coil 48, causing the electrical circuit connection of bimetal coil 48 and conductor 50 to open creating a high impedance arc gap therebetween until the short circuit is repaired. The oppositely wound bimetal coil provides automatic temperature compensation for changes in ambient temperature. For example, with an increase in ambient temperature, any expansion of the bimetal coil 56 will cause an equal and opposite expansion of bimetal coil 48. Thus no actual movement of the ends of the two bimetal coils occur because of an increase or decrease in ambient temperature.

Figure 3:
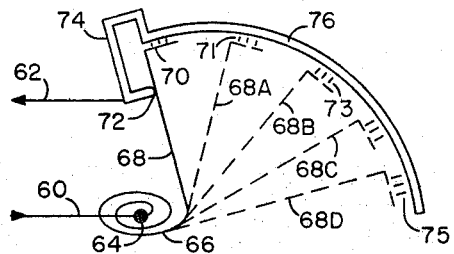
FIGURE 3 is another modified embodiment of the short circuit detector apparatus of this invention.

Referring now to another modification of the short circuit detector apparatus, see FIGURE 3, a bimetal coil 66 is connected at its inner end to a resistor 64 that is in turn connected by line 60 to the high voltage, low current power supply 10. Line 60 is connected to the fence conducting wire circuit. The end 68 of the bimetal coil 66 is resiliently biased into electrical contact with conductor 72. When a short circuit occurs in the fence circuit 62, then current flows through line 60, resistor 64, through end 68 of the bimetal coil 66, and out conductor 62. Resistor 64 heats and in turn heats the bimetal coil 66. After a given time delay coil 66 creates sufficient force to overcome the spring loading, causing expansion of the coil 66 and clockwise movement of end 68. Coil 66 having acquired a given amount of heat rapidly moves to one of positions 68A, 68B, 68C, 68D, or some position therebetween, depending upon the degree of expansion of the coil. As may be seen, conductor member 76 is connected to the other side of the circuit through conductor 74 and is curved in the direction of movement of end 70. Thus a small current continues to flow through the arcs, for example 71 or 73, throughout the movement of end 68. However the larger the movement, the wider the arc gap, the larger the impedance and the smaller the current flow. Accordingly, as the resistor 64 cools, the end 68 gradually moves toward conductor 72 until a stable position is reached; which position is determined by that arc gap spacing between end 71 and conductor 76 that provides a current heat condition that causes the temperature of coil 66 to equal the spring loading force in the coil. The bimetal end 68 will thus stay in position 68A, 68B, 68C, or 68D until the short circuit condition is corrected.

Should a short circuit condition occur in another line, then the overall current available for the plurality of parallel circuits is reduced. This causes a slight reduction in current to line 60 and as a result the end 68 of the bimetal coil moves a slight distance toward conductor 72 to a new stable position. The parameters of the circuit components are so established that the current flow resulting from the arcing condition is sufficient to keep the bimetal member heated an exact amount to hold a given position.

The arcing does not destroy the members 70 and 76 because of the low current involved. This system can operate several separate short circuit detectors in several separate sections or strands of fence from a single power supply. Thus, even though several sections have short circuit conditions, the current drain through the gaps is so low that the power supply 10 still provides the 2,000 volt pulsating output for the remaining sections.

Figure 4:
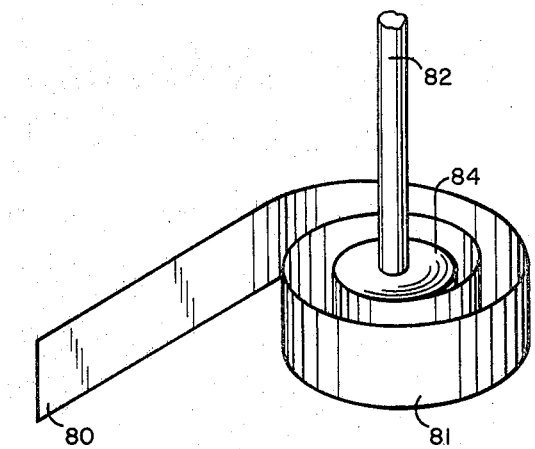
FIGURE 4 is another modified embodiment of the short circuit detector apparatus of this invention.
Figure 5:
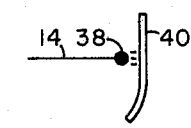
FIGURE 5 is a partial illustration of the arc gap electrical connection of the short circuit detector apparatus of FIGURES 1 and 2.

The modification illustrated in FIGURE 4 comprises a bimetal coil 81 having a free end 80 and a resistive material 84 being adhered to the inner surface of the inner portion of the coil 81. The resistive material 84 may comprise for example, carbon powder in an epoxy binder that forms a resistive button having a conductor 82 embedded in its center. The resistive material 84 makes electrical and thermal contact with the bimetal member and heats the bimetal member upon current flow in the manner previously described. This modified construction can be used in the other embodiments of our invention that are described herein.

Having described our invention, we now claim:

1. A short circuit detector for electric fences comprising,
   power supply means for supplying power having a high voltage and low current to at least one conductor wire circuit in an electric fence,
   and low mass detector means responsive to a short circuit in said conductor wire circuit for substantially opening said circuit and maintaining a high impedance arc between said power supply and said conductor wire circuit.

2. A short circuit detector for electric fences as claimed in claim 1 in which,
   said detector means is positioned in said conductor wire circuit and provides a visual indication of short circuit current flow in said conductor wire circuit.

3. A short circuit detector for electric fences as claimed in claim 1 in which,
   said detector means is positioned in said wire circuit and said arc provides an audible indication that a short circuit exists in said conductor wire circuit.

4. A short circuit detector for electric fences as claimed in claim 1 in which,
   said detector means in response to a short circuit in said conductor wire circuit being conditioned to automatically close said circuit upon correcting said short circuit.

5. A short circuit detector for electric fences as claimed in claim 1 in which,
   said detector means is positioned in said wire circuit and requires low power for operation.

6. A short circuit detector for electric fences as claimed in claim 1 in which,
   said detector means comprises a spiral wound bimetal conductor and resistor electrically connected in series with said circuit,
   the free end of said bimetal conductor being capable of opening and closing said circuit,
   said current flow in response to said short circuit heating said resistor, and
   the heat from said resistor causing movement of said free end of said bimetal conductor to open said circuit.

7. A short circuit detector for electric fences as claimed in claim 6 in which,
   upon said circuit becoming open, said free end of said bimetal conductor creating a stable arc gap high impedance limiting the current flow in said circuit.

8. A short circuit detector for electric fences as claimed in claim 1 in which,
   said detector means comprises first and second spiral wound bimetal conductors with their center ends being rigidly connected to each end of a resistor,
   said bimetal conductors are wound in opposite directions with the free end of said first bimetal conductor being capable of opening and closing said circuit and the free end ef said second bimetal conductor being connected to said wire circuit, and
   a heat shield being positioned between said resistor and said second bimetal conductor.

9. A short circuit detector for electric fences as claimed in claim 1 in which,
   said detector means comprises a spiral wound bimetal conductor having a resistor connected to the center end with said resistor being connected in series with said circuit,
   the outer free end of said bimetal conductor having a flat end and being capable of contacting an end of said conductor wire and opening and inserting a high impedance in said circuit through a curved path of movement, said end of said conductor wire having a conductor connected to a curved plate, and said curved plate being positioned adjacent the open circuit position of said flat end and aligned adjacent the curve of movement of said flat end for electrically holding said free end of said bimetal member in the open circuit position by an arc gap current flow between said curved plate and said flat end.

10. A short circuit detector for electric fences as claimed in claim 9 in which, said arc gap between said curved plate and the curved path of movement of said flat end increasing with the distance between said free end and said end of said conductor wire.

11. A short circuit detector for electric fences as claimed in claim 1 in which, said detector means comprises a spiral wound bimetal conductor having resistor means at the center of said spiral, said resistor means being connected in series to one end of said conductor wire, said free end of said bimetal conductor being capable of opening and closing said circuit in response to heat received from said resistor, and said resistor being heated by current flowing in said circuit.

References Cited
UNITED STATES PATENTS

| | | | |
|---|---|---|---|
| 1,976,721 | 10/1934 | Gengler | 256—10 |
| 2,801,350 | 7/1957 | Saunders | 307—132 |

JOHN W. CALDWELL, Primary Examiner

DANIEL MYER, Assistant Examiner

U.S. Cl. X.R.

256—10; 307—94; 340—255